United States Patent
Funaki et al.

(10) Patent No.: US 6,447,588 B1
(45) Date of Patent: Sep. 10, 2002

(54) WATER-AND-OIL REPELLANT COMPOSITION OF AQUEOUS DISPERSION TYPE

(75) Inventors: Hiroshi Funaki, Chiba; Ryuji Seki, Kanagawa, both of (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/719,562

(22) PCT Filed: Apr. 28, 2000

(86) PCT No.: PCT/JP00/02832

§ 371 (c)(1),
(2), (4) Date: Dec. 28, 2000

(87) PCT Pub. No.: WO00/66677

PCT Pub. Date: Nov. 9, 2000

(30) Foreign Application Priority Data

Apr. 28, 1999 (JP) ............................................. 11-123003

(51) Int. Cl.$^7$ ......................... C09K 3/18; D21H 21/16; D21H 17/11; D21H 17/46
(52) U.S. Cl. ......................... 106/2; 252/8.57; 252/8.62; 428/473; 428/537.5
(58) Field of Search ............................ 106/2; 252/8.57, 252/8.62; 428/473, 537.5

(56) References Cited

U.S. PATENT DOCUMENTS

| | | | | |
|---|---|---|---|---|
| 5,091,550 A | * | 2/1992 | Falk et al. | 558/158 |
| 5,525,732 A | * | 6/1996 | Haniff et al. | 546/248 |
| 6,315,822 B1 | * | 11/2001 | Oharu et al. | 106/2 |

FOREIGN PATENT DOCUMENTS

| | | | |
|---|---|---|---|
| EP | 0 462 063 | | 12/1991 |
| JP | 56-138197 | | 10/1981 |
| JP | 57-11298 | | 1/1982 |
| JP | 57-51897 | | 3/1982 |
| JP | 2000-144120 | * | 5/2000 |

* cited by examiner

*Primary Examiner*—Anthony J. Green
(74) *Attorney, Agent, or Firm*—Oblon, Spivak, McClelland, Maier & Neustadt, P.C.

(57) ABSTRACT

A water dispersion type water and oil repellent composition which undergoes little change in viscosity even if freezing/thawing cycles are repeated and which is excellent in storage stability. The dispersion is capable of imparting excellent water and oil resistance to paper. A water dispersion type water and oil repellent composition contains a compound which is mixable with water and has a flash point of from 50 to 150° C. A polyfluoroalkyl group-containing phosphate may be incorporated into the mixture.

13 Claims, No Drawings

WATER-AND-OIL REPELLANT COMPOSITION OF AQUEOUS DISPERSION TYPE

TECHNICAL FIELD

The present invention relates to a water dispersion type water and oil repellent composition which is excellent in storage stability and which undergoes little change in viscosity even when freezing/thawing cycles are repeated. Particularly, the present invention relates to a water dispersion type water and oil repellent composition which is capable of imparting excellent water and oil resistance to paper constantly.

BACKGROUND ART

As a water and oil repellent for paper, a phosphate containing a polyfluoroalkyl group (hereinafter referred to as $R^f$) is known. Such a water and oil repellent is widely employed, for example, in internal sizing treatment wherein it is incorporated at the time of sheeting paper or size press treatment wherein sheeted paper is dipped.

However, a water dispersion type water and oil repellent composition containing a $R^f$-containing phosphate as the main component has no adequate storage stability, and the viscosity tends to increase when freezed during storage or during transportation. The water dispersion type water and oil repellent composition having the viscosity thus increased, is incapable of imparting adequate water and oil resistance to paper. Accordingly, with a conventional water dispersion type water and oil repellent composition, it has been necessary to pay an attention to the environment for storage, for example, by controlling the temperature to prevent freezing.

In order to improve the storage stability of a water dispersion type water and oil repellent composition, an oil resistant agent for paper having an anionic surfactant added to a $R^f$-containing phosphate (JP-A-64-6196) or a water and oil repellent having a fluoroaliphatic hydrocarbon added to a $R^f$-containing phosphate (JP-A-56-138197) has, for example, been proposed.

By the above proposed improvements, the storage stability has been improved to some extent, but has not yet been practically satisfactory. Further, there has been a problem from the viewpoint of the handling efficiency such that the flash point of the additive itself is low.

The present invention has an object to provide a water dispersion type water and oil repellent composition which is excellent in storage stability and which undergoes little change in viscosity even when freezing/thawing cycles are repeated. Particularly, the present invention has an object to provide a water dispersion type water and oil repellent composition which is capable of imparting excellent water and oil resistance to paper constantly.

DISCLOSURE OF THE INVENTION

The present invention provides a water and oil repellent composition, particularly a water dispersion type water and oil repellent composition, comprising a compound represented by the following formula 1 and the following compound B, as essential components:

$$[R^fQO]_m[HO]_n[Y^+O^-]_kP=O \quad \text{Formula 1}$$

provided that the symbols in the formula have the following meanings:

$R^f$: a polyfluoroalkyl group,

Q: a bivalent organic group, $Y^+$: ($N^+HI^1R^2R^3$) or an alkali metal cation, wherein each of $R^1$, $R^2$ and $R^3$, which are independent of one another, is a hydrogen atom, $-CH_2CH_2OH$, $-CH_2CH_2CH_2OH$, $-CH(CH_3)CH_2OH$ or $-CH_2CH(OH)CH_3$, m, n and k: each being an integer, $m \geq 1$, $n \geq 0$, $k \geq 0$, and m+n+k=3;

Compound B: a compound which is miscible with water at any optional ratio and which has a flash point of from 50 to 150° C.

BEST MODE FOR CARRYING OUT THE INVENTION

The water and oil repellent composition of the present invention contains the compound (hereinafter referred to also as the compound A) represented by the formula 1, as an essential component.

$R^f$ in the compound A represents a polyfluoroalkyl group, which is a group having at least two hydrogen atoms in an alkyl group substituted by fluorine atoms. The carbon number of $R^f$ is preferably from 2 to 20. If the carbon number is less than 2, the oil resistance tends to be low, and if it exceeds 20, the compound tends to be solid at room temperature and have a large sublimation property, whereby handling tends to be difficult. The carbon number of $R^f$ is particularly preferably from 6 to 16. $R^f$ is a straight chain or branched group, preferably a straight chain group. In the case of a branched group, it is preferred that the branch moiety is present at a terminal portion of $R^f$ and the branch moiety is a short chain having a carbon number of from about 1 to 4.

The number of fluorine atoms in $R^f$ is preferably at least 60%, particularly preferably at least 80%, when it is represented by [(number of fluorine atoms in $R^f$)/(number of hydrogen atoms contained in an alkyl group having the same carbon number as $R^f$)]×100(%). $R^f$ is preferably a group having all hydrogen atoms in an alkyl group substituted by fluorine atoms, i.e. a perfluoroalkyl group. Further, $R^f$ is preferably a straight chain perfluoroalkyl group i.e. a group represented by $F(CF_2)_i-$ (i is an integer of from 2 to 20), particularly a group wherein i is an integer of from 6 to 16.

Further, $R^f$ may contain a halogen atom other than a fluorine atom. As such other halogen atom, a chlorine atom is preferred. Further, an etheric oxygen atom or a thioetheric sulfur atom may be inserted between a carbon-carbon bond in $R^f$. The structure of the terminal portion of $R^f$ may, for example, be $-CF_2CF_3$, $-CF(CF_3)_2$, $-CF_2H$, $-CFH_2$, or $-CF_2Cl$, preferably $-CF_2CF_3$.

A specific example of $R^f$ may be $C_4F_9-$ including structurally isomeric groups such as $F(CF_2)_4-$, $(CF_3)_2CFCF_2[F(CF_2)_4-$, $(CF_3)_3C-$ and $F(CF_2)_2CF(CF_3)-]$, $C_5F_{11}-$ [such as $F(CF_2)_5-]$, $Cl(CF_2)_s-$, $H(CF_2)_s-$ (s is an integer of from 2 to 5) or $(CF_3)_2CF(CF_2)_q-$ (q is 1, 2, 14), but the following groups are preferred.

$C_6F_{13}-$ [including structurally isomeric groups such as $F(CF_2)_6-$, $(CF_3)_2CF(CF_2)_3-$, $(CF_3)_3C(CF_2)_2-$ and $F(CF_2)_4CF(CF_3)-]$, $C_7F_{15}-$ [such as $F(CF_2)_7-]$, $C_8F_{17}-$ [such as $F(CF_2)_8-]$, $C_9F_{19}-$ [such as $F(CF_2)_9-]$, $C_{10}F_{21}-$ [such as $F(CF_2)_{10}-]$, $C_{12}F_{25}-$ [such as $F(CF_2)_{12}-]$, $C_{14}F_{29}-$[such as $F(CF_2)_{14}-]$, $C_{16}F_{33}-$[such as $F(CF_2)_{16}-]$, $Cl(CF_2)_t-$, $H(CF_2)_t-$ (t is an integer of from 6 to 16), $(CF_3)_2CF(CF_2)_y-$ (y is an integer of from 3 to 13), etc.

A specific example of a case where $R^f$ is a group having an etheric oxygen atom or a thioetheric sulfur atom inserted between a carbon-carbon bond, may be $F[CF(CF_3)CF_2O]_h$ $CF(CF_3)(CF_2)_2$—, $F[CF(CF_3)CF_2O]_kCF(CF_3)$—, $F[CF(CF_3)CF_2O]_j(CF_2)_2$—, $F[(CF_2)_2O]_p(CF_2)_2$—, $F[CF(CF_3)CF_2S]_hCF(CF_3)(CF_2)_2$—, $F[CF(CF_3)CF_2S]_kCF(CF_3)$—, $F[CF(CF_3)CF_2S]_j(CF_2)_2$—, $F[(CF_2)_2S]_p(CF_2)_2$—, (h is an integer of from 5 to 10, k is an integer of 1 or from 5 or 10, j is 5 or 6, and p is an integer of 1 or from 8 to 11), etc., but the following groups are preferred, wherein r is an integer of from 1 to 4, z is an integer of from 2 to 4, and v is an integer of from 2 to 7.

$F(CF_2)_5OCF(CF_3)$—, $F[CF(CF_3)CF_2O]_rCF(CF_3)(CF_2)_2$—, $F[CF(CF_3)CF_2O]_zCF(CF_3)$—, $F[CF(CF_3)CF_2O]_z(CF_2)_2$—, $F[(CF_2)_2O]_v(CF_2)_2$—.

$F(CF_2)_5SCF(CF_3)$—, $F[CF(CF_3)CF_2S]_rCF(CF_3)(CF_2)_2$—, $F[CF(CF_3)CF_2S]_zCF(CF_3)$—, $F[CF(CF_3)CF_2S]_z(CF_2)_2$—, $F[(CF_2)_2S]_v(CF_2)_2$—, $C_8F_{17}SO_2N(C_2H_5)$—.

Each of m, n and k in the compound A is an integer, $m \geq 1$, $n \geq 0$ and $k \geq 0$, and m+n+k=3. m is preferably 1 or 2, and n is preferably 0.

Q in the compound A is a bivalent organic group and may, for example, be a $C_{2-6}$ alkylene group or —$SO_2NR^4R^5$— ($R^4$ and $R^5$ are a $C_{1-5}$ alkylene group). Q is preferably —$CH_2CH_2$— or —$SO_2N(C_2H_5)CH_2CH_2$—.

$Y^+$ in the compound A is $(NH^+R^1R^2R^3)$ or an alkali metal cation. Here, each of $R^1$, $R^2$ and $R^3$ which are independent of one another, is a hydrogen atom, —$CH_2CH_2OH$, —$CH_2CH_2CH_2OH$, —$CH(CH_3)CH_2OH$ or —$CH_2CH(OH)CH_3$. The alkali metal cation may, for example, be $Na^+$. $Y^+$ is preferably $(NH^+R^1R^2R^3)$ wherein $R^1$ is a hydrogen atom, and $R^2$ and $R^3$ are —$CH_2CH_2OH$.

The following compounds may be mentioned as specific examples of the compound A. In the following compounds, a polyfluoroalkyl group may be any one of structurally isomeric groups and preferably a straight chain group.

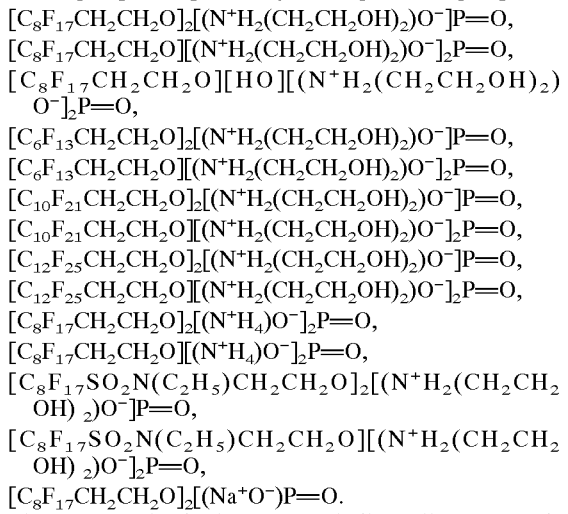

The compound A in the water and oil repellent composition may be a mixture of two or more compounds. In the case of a mixture of two or more compounds, they may be two or more compounds which are different in m, n or k, or two or more compounds which are different in the carbon number of $R^f$. The water and oil repellent composition of the present invention contains the compound B as an essential component. The compound B is mixable with water at any optional ratio and has a flash point of from 50 to 150° C.

The following compounds may be mentioned as the compound B.

Propylene glycol (hereinafter referred to as PG), ethylene glycol (hereinafter referred to as EG), dipropylene glycol, tripropylene glycol, diethylene glycol diethyl ether, dipropylene glycol monomethyl ether, diethylene glycol dimethyl ether, ethylene glycol monoethyl ether, ethylene glycol monomethyl ether, ethylene glycol monobutyl ether, propylene glycol monomethyl ether, propylene glycol monomethyl ether monoacetate, tripropylene glycol monomethyl ether, propylene glycol dibutyl ether, tetrapropylene glycol, etc.

As the compound B (the indication in ( ) after the name of a compound shows the flash point), PG (107° C.), EG (at least 110° C.), dipropylene glycol (137° C.), dipropylene glycol monomethyl ether (74° C.), tripropylene glycol (at least 110° C.), diethylene glycol dimethyl ether (50° C.) or diethylene glycol diethyl ether (82° C.) is preferred, and particularly preferred is PG. The proportion of the compound B in the water and oil repellent composition is preferably from 3 to 40 mass %, relative to the compound A. If the amount of the compound B is less than 3 mass % relative to the compound A, the effect of the compound B as a stabilizer will not sufficiently be provided, and when freezing/thawing cycles of the water and oil repellent composition is repeated, the increase of the viscosity tends to be large. Further, if it exceeds 40 mass %, when applied to a substrate such as paper, the compound B tends to remain on the surface of the substrate, whereby no adequate water and oil resistance tends to be imparted to the substrate. Further, the viscosity of the water and oil repellent composition tends to be low, and the composition tends to undergo separation during the storage.

Further, the proportion of the compound B in the water and oil repellent composition is preferably from 1 to 10 mass %. Within this range, the viscosity of the water and oil repellent composition is good. The compound B in the water and oil repellent composition may be composed of a single compound or two or more compounds.

The method for preparing the water and oil repellent composition of the present invention is not particularly limited. For example, there may be mentioned a method wherein the compound B is added at the time of preparing the compound A, a method wherein the compound B is added at the time of preparing the compound A, a method wherein the compound B is added at the time of dispersing the compound A in a medium, or a method wherein the compound B is added at the time of adjusting the concentration of the compound A.

For the water and oil repellent composition comprising the compound A and the compound B, it is preferred that the respective components are sufficiently dispersed or mutually solublized by a method such as stirring. At that time, it is preferred to carry out high pressure emulsification treatment by means of e.g. Manton Gorlin, Hydroshare or Microfluidizer. The pressure during the high pressure emulsification is preferably from 10 to 500 kg/cm², and the temperature is preferably from 30 to 90° C.

When high pressure emulsification is to be carried out, preliminary dispersion or emulsification may be carried out, as the case requires, to improve the efficiency of the high pressure emulsification.

To the water and oil repellent composition of the present invention, components other than the above (hereinafter referred to as other components) may be added. Particularly, the water and oil repellent composition of the present invention is of a water dispersion type employing an aqueous medium as described below. Other components may, for example, be preferably a medium other than the compound B, a water and oil repellent other than the compound A, an insecticide, a flame retardant, an antistatic agent or a sizing agent.

The medium other than the compound B is preferably an aqueous medium, such as a medium composed solely of water, or water and a water-soluble organic solvent other than the compound B, particularly preferably solely of water. The amount of the medium is preferably from 50 to 95 mass % in the water and oil repellent composition.

The viscosity of the water and oil repellent composition of the present invention is preferably from 20 to 100 cP at a shear rate of 191.5 s$^{-1}$ at a temperature of 25° C. Further, when one cycle comprises storage at −18° C. for 12 hours and storage at +40° C. for 12 hours, the viscosity after repeating it for five cycles, is preferably from 90 to 110% of the initial viscosity. If the viscosity is less than 20 cP, the dispersion state of the water and oil repellent composition tends to be poor, and if it exceeds 100 cP, handling tends to be difficult.

The water and oil repellent composition of the present invention is excellent in storage stability and undergoes little change in the viscosity even when freezing/thawing cycles are repeated. Particularly when the water and oil repellent composition of the present invention is used for treating a substrate, excellent water and oil resistance can be imparted to the surface of the substrate constantly. The substrate is not particularly limited, but paper, natural leather or synthetic leather is, for example, preferred. The water and oil repellent composition of the present invention is capable of imparting excellent water resistance (the sizing property) and the oil resistance to paper, natural leather or synthetic leather.

In the present invention, the mechanism whereby the change in viscosity of the water and oil repellent composition after repeating freezing/thawing cycles, is little, and the composition is excellent in storage stability, is not clearly understood. However, it is considered that the compound B serves as a dispersant for the compound A, whereby the compound A is associated to prevent a change of the physical state.

EXAMPLES

The present invention will be described with reference to Preparation Examples (Examples 1 and 2), Working Examples (Examples 3 to 6) and Comparative Examples (Example 7).

Example 1

Into a 1 l four-necked flask made of glass equipped with a stirrer, a dropping funnel, a reflux condenser and a thermometer, 120 g of phosphorus oxychloride was charged, and the internal temperature of the reactor was adjusted to be 90° C. Then, 605 g of $F(CF_2)_x(CH_2)_2OH$ (x is a mixture of 6, 8, 10, 12 and 14, and the average is 9) was dropwise added thereto over a period of 5 hours. Further, 21.7 g of water was dropwise added over a period of 4 hours. Then, formed hydrogen chloride gas was removed by a nitrogen stream over a period of 5 hours. The reaction product was analyzed by $^{31}$PNMR, whereby the main product was $[F(CF_2)_8(CH_2)_2O]_2[HO]P=O$.

Then, into a 5 l four-necked flask made of glass equipped with a stirrer, a dropping funnel, a reflux condenser and a thermometer, 120 g of diethanol amine (hereinafter referred to as DEA) and 2440 g of water were charged, and the entire amount of the above mentioned reaction product was dropwise added thereto at 90° C. over a period of one hour. Further, stirring was continued for two hours to obtain a dispersion of a $R^f$—containing phosphate (the main product was $[F(CF_2)_8(CH_2)_2O]_2[(N^+H_2(CH_2CH_2OH)_2)O^-]P=O)$.

The above dispersion was maintained at from 60 to 70° C. and treated at 200 kg/cm$^2$ by means of a high pressure emulsifier (Manton Gorline). The solid content concentration of the dispersion was 25.6 mass %. This is referred to as dispersion 1.

Example 2

A dispersion was obtained in the same manner as in Example 1 except that 102 g of PG was added to 120 g of DEA. The solid content concentration of the dispersion was 25.1 mass % (the proportion of PG relative to the compound A was 12.3 mass %). This is referred to as dispersion 2.

Example 3

99 Mass parts of dispersion 1 and 1 mass part of PG (the proportion of PG relative to the compound A was 3.9 mass %) were mixed and well shaken to uniformly dissolve PG in the dispersion.

Example 4

The operation was the same as in Example 3 except that in Example 3, dispersion 1 was changed to 97 mass parts, and PG was changed to 3 mass parts (the proportion of PG relative to the compound A was 12.1 mass %).

Example 5

The operation was the same as in Example 3 except that in Example 3, dispersion 1 was changed to 95 mass parts, and PG was changed to 5 mass parts (the proportion of PG relative to the compound A was 20.6 mass %).

Example 6

Dispersion 2 was employed as it was.

Example 7

Dispersion 1 was employed as it was.
Freezing/Thawing Cycles Operation

With respect to each dispersion, an operation of "standing still at −18° C. for 12 hours and then standing still at 40° C. for 12 hours" was repeated five times. Each dispersion was completely frozen at −18° C.
Pretreated Paper To 360 ml of a pulp slurry having a concentration of 3 mass %, 1 g of M-15 (Cationic modifying agent, manufactured by Meisei Kagaku K. K.) was added, followed by stirring for 5 minutes. To such slurry solutions, the dispersions obtained in Examples 3 to 7 (hereinafter referred to as pre-freezing products) or the respective dispersions subjected to the above mentioned freezing/thawing cycles operations (hereinafter referred to as post-freezing products) were added, respectively, in a solid content of 0.45 mass %, followed by sheeting at 60 g/m$^2$. Each sheet was dried for 100 seconds by a drum drier heated to 100° C. to obtain a pre-treated paper.
Size Pressed Paper Using the pre-freezing products obtained in Examples 3 to 7 or the respective post-freezing products, treating baths having a solid content of 0.5 mass % were prepared by diluting them with water. With such treating baths, non-sized paper (weight: 50 g/m$^2$) was dip-treated by means of a size press at a rate such that the squeezing ratio was 50%. Each paper was dried for 10 seconds by a drum drier heated to 100° C. to obtain a size pressed paper.

Viscosity

With respect to the pre-freezing products obtained in Examples 3 to 7 or the respective post-freezing products, the viscosities at a shear rate of 191.5 s$^{-1}$ at a temperature of 25° C. were measured by means of an E-model viscometer (TVE-20H, manufactured by Tohki Sangyo). The results are shown in Table 1 (unit: cP).

Still Standing Separation

Each of the pre-freezing products obtained in Examples 3 to 7 was put into a cylindrical glass bottle having a height of 11 cm and an internal capacity of 100 ml to a height of 10 cm. After it was left to stand still for one week, the proportion of a transparent phase formed by separation of the dispersion was measured. The results are shown in Table 1 (unit: vol %).

Air Bubble Inclusion

With respect to the pre-freezing products obtained in Examples 3 to 7 or the respective post-freezing products, each product was put into a cylindrical glass bottle having a height of 11 cm and an internal capacity of 100 ml to a height of 5 cm. By means of KM-SHAKER (manufactured by Iwaki Sangyo), it was shaken for one minute at a rate of 100 times/min and then left to stand still for three days, whereupon the degree of air bubble inclusion was visually inspected (○: no change from before shaking, Δ: slight inclusion of bubbles was observed, X: substantial inclusion of bubbles was observed). The results are shown in Table 1.

Oil Resistance

In accordance with a 3M Kit test (TAPPI-RC-338), a test oil blended to have a composition shown in Table 2 (unit: ml) was placed on the surface of the size pressed paper, and evaluation was made by the kit number of the test oil penetrated. The larger the value, the better the oil resistance. The results are shown in Table 3.

Water Resistance (Sizing Degree)

In accordance with JIS-P-8122-1976, the Stockigt sizing degree (water resistance) was measured. The larger the value, the better the water resistance. The results are shown in Table 3 (unit: sec.).

In Tables 1 and 3, a pre-freezing product is abbreviated as "Pre", and a post-freezing product is abbreviated as "Post".

TABLE 1

| | Viscosity | | Still standing | Air bubble inclusion | |
|---|---|---|---|---|---|
| | Pre | Post | separation | Pre | Post |
| Ex. 3 | 85 | 93 | <1 | ○ | ○ |
| Ex. 4 | 65 | 62 | 1 | ○ | ○ |
| Ex. 5 | 57 | 58 | 5 | ○ | ○ |
| Ex. 6 | 71 | 73 | 1 | ○ | ○ |
| Ex. 7 | 90 | 125 | <1 | Δ | X |

TABLE 2

| Kit No. | Castor oil | Toluene | Heptane |
|---|---|---|---|
| 1 | 200 | 0 | 0 |
| 2 | 180 | 10 | 10 |
| 3 | 160 | 20 | 20 |
| 4 | 140 | 30 | 30 |
| 5 | 120 | 40 | 40 |
| 6 | 100 | 50 | 50 |
| 7 | 80 | 60 | 60 |
| 8 | 60 | 70 | 70 |
| 9 | 40 | 80 | 80 |
| 10 | 20 | 90 | 90 |
| 11 | 0 | 100 | 100 |
| 12 | 0 | 90 | 110 |

TABLE 2-continued

| Kit No. | Castor oil | Toluene | Heptane |
|---|---|---|---|
| 13 | 0 | 70 | 130 |
| 14 | 0 | 50 | 150 |
| 15 | 0 | 30 | 170 |
| 16 | 0 | 0 | 200 |

TABLE 3

| | Pre-treated paper | | | | Size pressed paper | | | |
|---|---|---|---|---|---|---|---|---|
| | Oil resistance | | Sizing degree | | Oil resistance | | Sizing degree | |
| | Pre | Post | Pre | Post | Pre | Post | Pre | Post |
| Ex. 3 | 14 | 14 | 13 | 13 | 8 | 7 | 13 | 12 |
| Ex. 4 | 14 | 14 | 13 | 13 | 8 | 8 | 13 | 13 |
| Ex. 5 | 14 | 14 | 13 | 13 | 8 | 8 | 13 | 13 |
| Ex. 6 | 14 | 14 | 13 | 13 | 8 | 8 | 13 | 13 |
| Ex. 7 | 14 | 12 | 13 | 6 | 8 | 5 | 13 | 8 |

What is claimed is:

1. A water and oil repellent composition comprising a compound represented by the following formula 1 and propylene glycol

  Formula 1 provided that the symbols in the formula have the following meanings:

$R^f$: a polyfluoroalkyl group,

Q: a bivalent organic group, $Y^+$: ($N^+HR^1R^2R^3$) or an alkali metal cation, wherein each of $R^1$, $R^2$ and $R^3$, which are independent of one another, is a hydrogen atom, $-CH_2CH_2OH$, $-CH_2CH_2CH_2OH$, $-CH(CH_3)CH_2OH$ or $-CH_2CH(OH)CH_3$, m, n and k: each being an integer, $m \geq 1$, $n \geq 0$, $k \geq 0$, and m+n+k=3.

2. The water and oil repellent composition according to claim 1, wherein $R^f$ in the formula 1 is a $C_{1-16}$ polyfluoroalkyl group.

3. The water and oil repellent composition according to claim 1, wherein Q in the formula 1 is $-CH_2CH_2-$.

4. The water and oil repellent composition according to claim 1, wherein $Y^+$ in the formula 1 is $H^+NHR^2R^3$ and wherein $R^2$ and $R^3$ are $-CH_2CH_2OH$.

5. The water and oil repellent composition according to claim 1, wherein in the formula 1, m is 1 or 2, and n is 0.

6. The water and oil repellent composition according to claim 1, wherein the viscosity of the water and oil repellent composition is from 20 to 100 cP at a shear rate of 191.5 s$^{-1}$ at a temperature of 25° C.

7. The water and oil repellent composition according to claim 1, wherein the viscosity after five freeze/thaw cycles is from 90 to 110% of an initial viscosity, wherein one freeze/thaw cycle comprises storage at −18° C. for 12 hours followed by storage at +40° for 12 hours.

8. The water and oil repellent composition according to claim 1, wherein Q in the formula is $-CH_2CH_2-$.

9. The water and oil repellent composition according to claim 8, wherein $Y^+$ in the formula 1 is $H^+NHR^2R^3$ and wherein $R^2$ and $R^3$ are $-CH_2CH_2OH$.

10. The water and oil repellent composition according to claim 9, wherein in the formula 1, m is 1 or 2, and n is 0.

11. The water and oil repellent composition according to claim 10, wherein the viscosity of the water and oil repellent composition is from 20 to 100 cP at a shear rate of 191.5 s$^{-1}$ at a temperature of 25° C.

12. The water and oil repellent composition according to claim 11, wherein the viscosity after five freeze/thaw cycles is from 90 to 110% of an initial viscosity, wherein one freeze/thaw cycle comprises storage at −18° C. for 12 hours followed by storage at +40° for 12 hours.

13. Paper, natural leather or artificial leather treated with the water and oil repellent composition as defined in claim 1.

* * * * *